United States Patent
Brown, deceased

[15] 3,679,733

[45] July 25, 1972

[54] N-SUBSTITUTED ARYLCARBAMOYL SULFIDES

[72] Inventor: Melancthon Starr Brown, deceased, late of Berkley, Calif. by Gustave K. Kohn, administrator

[73] Assignee: Chevron Research Company, San Francisco, Calif.

[22] Filed: Nov. 9, 1970

[21] Appl. No.: 88,105

[52] U.S. Cl............260/479 C, 260/294.8 C, 260/332.2 R, 260/347.2, 424/300
[51] Int. Cl........................................C07c 125/06
[58] Field of Search ..............................260/479 C

[56] References Cited

UNITED STATES PATENTS 2,533,189  12/1950  Flory et al..............................260/479

Primary Examiner—James A. Patten
Attorney—A. L. Snow, Frank E. Johnston, G. F. Magdeburger, John Stoner, Jr. and Dix A. Newell

[57] ABSTRACT

Compound of the formula

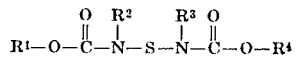

wherein $R^1$ and $R^4$ are individually aryl of six to 14 carbon atoms optionally substituted with alkyl groups, halogen atoms, nitro groups, alkoxy groups, alkylthio groups or dialkylamino groups; $R^2$ and $R^3$ are individually hydrogen or alkyl of one to four carbon atoms. The compounds are insecticides.

7 Claims, No Drawings

N-SUBSTITUTED ARYLCARBAMOYL SULFIDES

BACKGROUND OF THE INVENTION

Field

The present invention is directed to N-substituted aryl carbamoyl sulfides, particularly the bis-(N-substituted aryl carbamoyl) sulfides. The sulfides find use principally as insecticides.

DESCRIPTION OF THE INVENTION

The N-substituted aryl carbamoyl sulfides of the present invention may be represented by the general formula

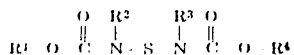

wherein $R^1$ and $R^4$ are individually aryl of six to 14 carbon atoms substituted with 0 to 4, preferably 0 to 2, halogens of atomic number 9 to 35 (fluorine, chlorine or bromine), nitro groups, alkyl groups of one to seven carbon atoms, alkoxy groups of one to five carbon atoms, or alkylthio groups of one to three carbon atoms; or 0 to 1 dialkylamino groups in which the alkyl groups contain individually one to three carbon atoms; $R^2$ and $R^3$ are individually hydrogen or alkyl of one to four carbon atoms. "Aryl" means a hydrocarbon group containing an aromatic ring or rings. The total number of substituents on the aryl group of $R^1$ or $R^4$ should not exceed 4. $R^1$ and $R^4$ can also be a heterocyclic group having a heteroatom, i.e., S, N or O, in the ring. Thus, $R^1$ and $R^4$ can be thienyl, furyl, pyridyl, preferably thienyl.

$R^1$ and $R^4$ can be the same or different and $R^2$ and $R^3$ can be the same or different. The preferred compounds of the present invention are those wherein $R^1$ and $R^4$ are the same and $R^2$ and $R^3$ are the same. Thus, the preferred compounds are the bis-(N-substituted aryl carbamoyl) sulfides.

The preferred substituents for $R^1$ and $R^4$ are halogen atoms of atomic number 9 to 35, nitro groups, alkyl groups of one to seven carbon atoms or alkoxy groups of one to five carbon atoms.

Preferably $R^1$ and $R^4$ are individually phenyl substituted with 0 to 4 halogen atoms of atomic number 9 to 35, nitro groups, alkyl groups of one to seven carbon atoms, or alkoxy of one to five carbon atoms or alkylthio groups of one to three carbon atoms or 0 to 1 dialkylamino groups in which the alkyl groups contain individually one to three carbon atoms; or naphthyl substituted with zero to four halogen atoms of atomic number 9 to 35, nitro groups, alkyl groups of one to four carbon atoms, alkoxy groups of one to five carbon atoms, alkylthio groups of one to three carbon atoms or 0 to 1 dialkylamino groups in which the alkyl groups contain individually one to three carbon atoms. Preferably alkyl groups substituted on the phenyl moiety will contain one to five carbon atoms. Still more preferably, the alkyl groups substituted on the phenyl or naphthyl moiety will contain one to four carbon atoms (of the alkyl groups, tert.butyl substituents are least preferred). The preferred halogen substituents on the phenyl naphthyl naphthyl moieties are chlorine or bromine, more preferably chlorine. The naphthyl moiety is preferably bonded to the carbamate oxygen either through the "one" or "two" carbon atoms.

Representative aryl groups which $R^1$ and $R^4$ may represent include phenyl, biphenyl, naphthyl, chlorophenyl, bromophenyl, chloronaphthyl, ethylphenyl, methylphenyl, 2-chloro-4-methylphenyl, 3-chloronaphthyl, 3-sec.butylphenyl, 3-sec.pentylphenyl, 2-iso-propylphenyl, 4-isopropylphenyl, 3-(1-methylbutyl) phenyl, 3-(1-ethylpropyl) phenyl, 3-t-amyl-6-chlorophenyl, 4-(1-ethylpropyl) phenyl, methoxyphenyl, butoxyphenyl, 2-nitrophenyl, 2-nitro-4-chlorophenyl, 4-methylthio-3-tolyl, 4-dimethylamino, 3-tolyl, etc.

$R^2$ and $R^3$ are preferably alkyl of one to four carbon atoms and more preferably methyl or ethyl. Representative $R^2$ and $R^3$ groups include, in addition to hydrogen, methyl and ethyl, the groups n-propyl, isopropyl, n-butyl, and isobutyl.

Furthermore, the preferred compounds of the present invention are those wherein $R^1$ and $R^4$ are the same and are naphthyl, phenyl substituted with 1 to 2 alkyl groups of one to five carbons atoms or alkoxy groups of one to four carbon atoms, preferably 3-alkylphenyl, 3-alkoxyphenyl, 3,4-dialkylphenyl, 3,5-dialkylphenyl, the alkyl substituent being from 1 to 5 carbon atoms and the alkoxy group having one to four carbon atoms, and $R^2$ and $R^3$ are the same and are methyl groups.

Representative compounds of the present invention include bis-(phenylcarbamoyl) sulphide, bis-(2-hapthylcarbamoyl) sulfide, bis-(2-fluorophenyl-N-methylcarbamoyl) sulfide, bis-(2,4-dichlorophenyl-N-methylcarbamoyl) sulfide, bis-(3-bromophenyl-N-methylcarbamoyl) sulfide, bis-(2-chloro-4-nitrophenyl-N-ethyl-carbamoyl) sulfide, bis-(2,3,4,5-tetrachlorophenyl-N-methylcarbamoyl) sulfide, bis-(4-ethylphenyl-N-methylcarbamoyl) sulfide, bis-(4-methoxyphenyl-N-methylcarbamoyl) sulfide, bis-(3-chloro-4-t-butylphenyl-N-methylcarbamoyl) sulfide, bis-(4-methylthiophenyl-N-methylcarbamoyl) sulfide, bis-(4-dimethylaminophenyl-N-methyl-carbamoyl) sulfide, bis-(3,5-dibutylphenyl-N-propyl-carbamoyl) sulfide, bis-(3-sec.butylphenyl-N-methylcarbamoyl) sulfide, bis-(2-chloro-4-diethylaminophenyl-N-ethyl-carbamoyl) sulfide, bis-(3-butylthio-5-ethylphenyl-N-methylcarbamoyl) sulfide, bis-(2,4-dinitrophenyl-N-methylcarbamoyl sulfide, bis-(1-naphthyl-N-methylcarbamoyl) sulfide, N-(phenyl-N-methylcarbamoylthio)-N-methyl-3-sec.butylphenylcarbamate.

The bis compounds of the present invention are made in accordance with the following reaction

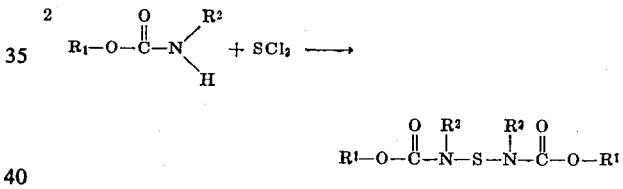

In the above equation $R^1$ and $R^2$ are as defined previously. It is understood that $R^3$ and $R^4$ may be written as $R^2$ and $R^1$, respectively, when discussing the bis compounds.

The carbamate and a basic acceptor such as pyridine or triethylamine are dissolved in a suitable inert solvent such as benzene, toluene, ether, preferably a chlorinated hydrocarbon such as methylene chloride or chloroform. The temperature is maintained between approximately $-°$ C. and the boiling point of the solvent, preferably between 0° to 35° C., during the gradual addition of sulfur dichloride. The reaction time will generally be from 15 minutes to several hours, i.e., 1 to 2 hours. Longer reaction times do not result in degradation of the product The amine salt is removed by water washing and the product solution dried, filtered and stripped of solvent. The product may be purified by recrystallization, or in the case of oils by chromatography.

Unsymmetrical compounds may be prepared by reaction of 1 mole of $SCl_2$ with 1 mole of a carbamate to produce an N-thiochlorocarbamate which may then be reacted with a different carbamate to give the unsymmetrical product. Reaction times and conditions, etc. are the same as that for the preparation of the bis compound.

The carbamate reactant in the above equation may and usually will represent a commercial carbamate insecticide. Conventional method for preparing such carbamates whether in situ or beforehand may be used. Such reactants are disclosed in U.S. Pat. Nos. 3,062,707; 3,062,864; 3,062,865; 3,062,866; 2,903,478; 3,084,096; 3,208,853; 3,167,472 and 3,242,145 and Pesticide Index, Third Edition, D.E.H. Frear (1965).

The preparation of the compounds of the present invention will be more fully understood by reference to the following examples.

EXAMPLE 1

A solution of 6 g. (bis-(mole) of distilled sulfur dichloride and 10 ml. of methylene chloride was added slowly to a solution of 20.9 g. (0.1 mole) of o-isopropoxyphenyl-N-methylcarbamate. The reaction mixture was stirred overnight and washed twice with 200 ml. portions of water, dried over magnesium sulfate, filtered and stripped. A residual oil was added to 50 ml. of benzene and approximately 1 g. of insoluble solid was removed by filtration. Following solvent removal, the residual oil was found to have an NMR spectrum compatible with the structure of bis-(2-isopropoxyphenyl-N-methylcarbamoyl) sulfide. The elemental analysis of the oil was

|     | Calculated | Found |
|-----|------------|-------|
| N % | 6.25       | 5.99  |
| S % | 7.15       | 7.72  |

EXAMPLE 2

7.9 g. (0.1 mole) pyridine and 20.7 (0.1 mole) of sec.-butylphenyl-N-methylcarbamate (actually mixed isomers containing 60 to 65 percent of the m-isomer, the resulting portion being o- and p-isomers) was mixed with 100 ml. of methylene chloride. The solution was cooled in an ice bath while 5.2 g. (0.05 mole) of distilled pure dichloride was added slowly. The reaction mixture was stirred at ice bath temperature for 30 minutes. Then the cooling bath and stirring was continued for 2 hours at ambient temperature. The solution was washed 2 times with 100 ml. portions of water, dried over magnesium sulfate and filtered. Following solvent removal under vacuum the residual oil was chromatographed on 200 ml. silica gel diluting with various mixtures of ether and hexane. The cuts containing pure product were stripped yielding 9 g. of oil. The elements analysis was

|     | Calculated | Found |
|-----|------------|-------|
| N % | 6.31       | 5.88  |
| S % | 7.22       | 8.71  |

The product was bis-(N-sec.butylphenyl-N-methylcarbamoyl) sulfide (60 percent was the m-isomer, the remaining portion being o- and p-isomers).

Using the general procedure of Examples 1 and 2, other compounds of this invention were prepared. These compounds and analyses are tabulated below in Table I.

TABLE I

| Compound | S Calcd. | S Found | N Calcd. | N Found | Melting point, ° C. |
|----------|----------|---------|----------|---------|---------------------|
| Bis-(4-t-butylphenyl-N-methylcarbamoyl) sulfide. | 7.22 | 7.30 | 6.31 | 6.19 | 58–162 |
| Bis-(3-t-butylphenyl-N-methylcarbamoyl) sulfide. | 7.22 | 7.07 | 6.31 | 6.26 | 111–115 |
| Bis-(3-isopropylphenyl-N-methylcarbamoyl) sulfide. | 7.71 | 7.87 | 6.72 | 6.57 | Oil |
| Bis-(α-naphthyl-N-methylcarbamoyl) sulfide. | 7.43 | 7.44 | 6.49 | 6.46 | 133–136 |
| Bis-(3,4-dimethylphenyl-N-methylcarbamoyl) sulfide. | 8.26 | 8.13 | 7.22 | 7.16 | 112–115 |
| Bis-(3,5-dimethylphenyl-N-methylcarbamoyl) sulfide. | 8.26 | 8.35 | 7.22 | 7.00 | 111–113 |

The compounds of the present invention find use principally as insecticides. Some of the compounds exhibit fungicidal activity. Representative compounds of the present invention were tested as follows to illustrate the insecticidal properties. Generally the compounds are very selective as to particular insects. The test results are reported in Table II.

TEST PROCEDURES

Aphids (*Aphis gossypii* Glover):

An acetone solution of the candidate toxicant containing a small amount of nonionic emulsifier was diluted with water to 30 ppm. Cucumber leaves infested with aphids were dipped in the toxicant solution. Mortality readings were then taken after 24 hours.

American Cockroach (*Periplaneta americana* L.):

A 500 ppm acetone solution of the candidate toxicant was placed in a microsprayer (atomizer). A random mixture of anesthetized male and female roaches were placed in a container and 50 mg. of the above described acetone solution was sprayed on them. A lid was placed on the container. A mortality reading was made after 24 hours.

Cabbage Looper (*Trichoplusia ni*):

An acetone solution of the candidate toxicant containing a small amount of nonionic emulsifier was diluted with water to 500 ppm. Cabbage leaf sections were dipped in the toxicant solution and dried. The sections were then infested with cabbage looper larvae. Mortality readings were taken after 24 hours.

Mosquito Larvae (*Aedes aegypti* L.):

A .05 ppm acetone solution of the candidate toxicant was added to 100 ml. of tap water containing 10 test larvae. Three replicates per compound were employed. Immediately after treatment the water was thoroughly admixed. The cuts were then covered and held in a controlled environment of 80° F. with continuous incandescent illumination. Mortality readings were made after 24 hours.

TABLE II.— PERCENT MORTALITY

| Compound | Aphids | Cockroach | Cabbage looper | Mosquito larvae |
|----------|--------|-----------|----------------|-----------------|
| Bis-[(m-sec. butylbutyl)phenyl-N-methylcarbamoyl] sulfide* |  | 90 | 80 | 100 |
| Bis-(3-isopropylphenyl-N-methylcarbamoyl) sulfide |  | 100 |  |  |
| Bis-(α-napthyl-N-methylcarbamoyl) sulfide |  | 60 |  |  |
| Bis-(3,4-dimethylphenyl-N-methylcarbamoyl) sulfide |  | 90 |  |  |
| Bis-(2-isopropoxyphenyl-N-methylcarbamoyl) sulfide | 100 | 99 |  |  |

*Primary compound—approximately 40% of the o- and P-isomers also present.

In addition to the specific formulations and application techniques described above, one or more of the compound derivatives of the invention may be applied in other liquid or solid formulations to the insects, their environment, or hosts susceptible to insect attack. For example, they may be sprayed or otherwise applied directly to plants or soil so as to effect control of insects coming into contact therewith.

Formulations of the compounds of this invention will comprise a toxic amount of one or more compound derivatives and a biologically inert carrier. Usually they will also contain a wetting agent. Solid carriers such as clay, talc, sawdust and the like may be used in such formulations. Liquid diluents which may be used with these compounds include water and aromatic solvents. In addition these formulations may contain other compatible pesticides, plant growth regulators, fillers, stabilizers, attractants and the like.

The concentration of the active ingredient to be used with inert carriers, either solid or liquid carriers, will be dependent upon many factors, such as the particular compound which is used, the carrier in or upon which it is incorporated, the method and conditions of application, the insect species to be controlled, etc., the proper consideration of these factors being within the skill of those versed in the art. In general, the toxic ingredients of this invention will be effective in concentrations from about 0.0001 percent, by weight, preferably 0.1 weight percent, to as high as 90 percent by weight or higher. Economically, of course, it is desirable to use lower concentrations of this active ingredient. Thus, it is usually desirable to use less than 20 percent by weight of the active ingredient in a particular composition.

The terms "insecticide" and "insect" as used herein refer to their broad and commonly understood usage rather than to those creatures which in the strict biological sense are classified as insects. Thus, the term "insect" is used not only to include small invertebrate animals belonging to the class *Insecta* but also to the other related classes of arthropods whose members are segmented invertebrates having more or fewer than six legs, such as spider, mites, ticks, centipedes, worms and the like.

One of the compounds, bis-(3,5-dimethylphenyl-N-methylcarbamoyl) sulfide, was found particularly effective in the control of the fungus *Botrytis cinaria*. Thus using a variation of "The Standard Spore Slide-Germination Method for Determining Fungicidal Activity," described in the *American Phytopathological Society Journal*, Volume 33, pages 627–632 (1943), the compound was tested for fungitoxic activity against spores. The compound was dissolved in acetone to a concentration of 100 ppm. The solution was then pipetted into wells of depression slides and allowed to dry. The wells were filled with a spore suspension of the test organism *Botrytis cinaria;* 10-fold greater volume of suspension was used than that used to apply the toxicant so that the slide concentration of toxicant was about 10 ppm. The spores were then incubated in a moist chamber overnight. A group of 100 spores was examined and the number of spores germinated and not germinated was counted and recorded to show the biological activity in terms of the percent germination inhibition. The compound bis-(3,5-dimethylphenyl-N-methylcarbamoyl) sulfide showed 98 percent inhibition.

When used as a fungicide, the compound will be formulated and applied in fungicidal amounts by conventional art methods to fungi or hosts which are subject to fungus attack, especially vegetative hosts such as plants, plant seeds, etc. The amount used will vary, of course, depending on the fungus, the host, etc. The compound may be combined with inert liquids or solid carriers as powders, solutions, dispersions, etc. When so combined, the compound should be in an amount of from 0.005 to 95 weight percent, preferably 1 to 50 weight percent. Suitable liquid carriers include water, kerosene, xylene, alcohols, alkylated naphthylene and glycols. Solid carriers include kaolin clays, diatomaceous earth, silica, talc, etc.

As will be evident to those skilled in the art, various modifications on this invention can be made or followed, in the light of the foregoing disclosure and discussion, without departing from the spirit or scope of the disclosure or from the scope of the following claims.

It is claimed:

1. Compound of the formula

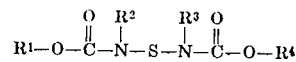

wherein $R^1$ and $R^4$ are individually aryl of six to 14 carbon atoms substituted with 0 to 4 halogens of atomic number 9 to 35 (fluorine, chlorine or bromine), nitro groups, alkyl groups of one to seven carbon atoms, alkoxy groups of one to five carbon atoms or alkylthio groups of one to three carbon atoms; or 0 to 1 dialkylamino groups in which the alkyl groups contain individually one to three carbon atoms; $R^2$ and $R^3$ are individually hydrogen or alkyl of one to four carbon atoms.

2. Compound of claim 1 wherein $R^1$ and $R^4$ are the same radical and $R^2$ and $R^3$ are the same radical.

3. Compound of claim 1 wherein $R^1$ and $R^4$ are individually phenyl substituted with zero to four halogen atoms of atomic number 9 to 35, nitro groups, alkyl groups of one to seven carbon atoms, alkoxy groups of one to five carbon atoms, or alkylthio groups of one to three carbon atoms; or 0 to 1 dialkylamino groups in which the alkyl groups contain individually one to three carbon atoms; or naphthyl substituted with zero to four halogen atoms of atomic number 9 to 35, nitro groups, alkyl groups of one to four carbon atoms, alkoxy groups of one to five carbon atoms, alkylthio groups of one to three carbon atoms; or 0 to 1 dialkylamino groups in which the alkyl groups contain individually one to three carbon atoms.

4. Compound of claim 3 wherein the alkyl groups substituted on the phenyl moiety contains one to five carbon atoms.

5. Compound of claim 1 wherein $R^2$ and $R^3$ are individually alkyl of one to four carbon atoms.

6. Compound of claim 1 wherein $R^1$ and $R^4$ are the same and are phenyl substituted with zero to four halogen atoms of atomic number 9 to 35, nitro groups, alkyl groups of one to seven carbon atoms or alkoxy groups of one to five carbon atoms or naphthyl substituted with zero to four halogen atoms of atomic number 9 to 35, nitro groups, alkyl groups of one to four carbon atoms or alkoxy groups of one to five carbon atoms and $R^2$ and $R^3$ are the same and are methyl or ethyl.

7. Compound of claim 1 wherein $R^1$ and $R^4$ are the same and are naphthyl, phenyl substituted with 1 to 2 alkyl groups of one to four carbon atoms or alkoxy groups of one to four carbon atoms, and $R^2$ and $R^3$ are the same and are methyl.

* * * * *